United States Patent
Peng et al.

(10) Patent No.: US 10,619,037 B2
(45) Date of Patent: *Apr. 14, 2020

(54) ROOFING COMPOSITIONS COMPRISING LINEAR LOW DENSITY POLYETHYLENE

(71) Applicant: JOHNS MANVILLE, Denver, CO (US)

(72) Inventors: Lichih R Peng, Littleton, CO (US); Jordan Kortmeyer, Parker, CO (US); Lance Wang, Parker, CO (US); Jawed Asrar, Englewood, CO (US)

(73) Assignee: Johns Manville, Denver, CO (US)

(*) Notice: Subject to any disclaimer, the term of this patent is extended or adjusted under 35 U.S.C. 154(b) by 169 days.

This patent is subject to a terminal disclaimer.

(21) Appl. No.: 15/819,865

(22) Filed: Nov. 21, 2017

(65) Prior Publication Data

US 2019/0153201 A1    May 23, 2019

(51) Int. Cl.
| | |
|---|---|
| *C08L 23/08* | (2006.01) |
| *E04D 5/08* | (2006.01) |
| *E04D 5/06* | (2006.01) |
| *C08L 23/14* | (2006.01) |

(52) U.S. Cl.
CPC ......... *C08L 23/0815* (2013.01); *C08L 23/142* (2013.01); *E04D 5/06* (2013.01); *E04D 5/08* (2013.01); *C08L 2201/02* (2013.01); *C08L 2205/02* (2013.01); *C08L 2205/035* (2013.01); *C08L 2205/08* (2013.01); *C08L 2207/02* (2013.01); *C08L 2207/066* (2013.01)

(58) Field of Classification Search
CPC ...... C08L 23/0815; C08L 23/142; E04D 5/06; E04D 5/08
See application file for complete search history.

(56) References Cited

U.S. PATENT DOCUMENTS

| | | | |
|---|---|---|---|
| 2004/0242778 A1* | 12/2004 | Etherton | C09J 123/0815 525/191 |
| 2009/0137168 A1* | 5/2009 | Peng | B32B 27/32 442/1 |

FOREIGN PATENT DOCUMENTS

WO    WO-2016137558 A1 *  9/2016   .......... C08L 23/0815

* cited by examiner

*Primary Examiner* — John E Uselding
(74) *Attorney, Agent, or Firm* — Robert D. Touslee

(57) ABSTRACT

Provided is a polymer blend composition comprising linear low density polyethylene, a propylene polymer generally having rubber dispersed therein, and a combination of a propylene copolymer and an ethylene copolymer. In one embodiment, there is provided a polymer blend composition comprising 15 to 75 weight percent of a propylene polymer having from 10-60% crystallinity, 30-50 weight percent of a linear low density polyethylene, and a combination of the propylene copolymer and the ethylene copolymer comprising the remainder of the composition.

12 Claims, No Drawings

ROOFING COMPOSITIONS COMPRISING LINEAR LOW DENSITY POLYETHYLENE

FIELD OF INVENTION

Formulations are provided which are useful in roofing applications. Linear low density polyethylene is blended with thermoplastic olefin (TPO) polymers, which blend can be used to prepare a roofing membrane of enhanced properties.

BACKGROUND OF THE INVENTION

Compositions and membranes comprising thermoplastic olefin (TPO) polymers have found widespread use in the roofing industry for commercial buildings. For roofing and other sheeting applications, the products are typically manufactured as membrane sheets. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in a warehouse. After installation, the membranes can be exposed during service to a wide range of conditions that may deteriorate or destroy the integrity of the membrane. As such, a membrane is desired that can withstand a wide variety of service temperatures, with a particular focus on thermal stability.

Thermoplastic olefin roofing membranes require high flexibility together with good mechanical stability at elevated temperatures, and high weathering resistance. A number of proposals for thermoplastic olefin films of this type are disclosed in the following publications.

US 2006/0046084 describes a thermoplastic polyolefin roofing membrane produced from a mixture of a polypropylene-based elastomer (PBE) and polyolefin copolymers.

US 2010/0255739 describes a roofing membrane with a composition comprising a propylene-based elastomer.

US 2010/0197844 describes a thermoplastic olefin membrane for use in construction materials which comprises a polypropylene-based elastomer.

PCT Publication WO 2010/0115079A1 is directed to roofing membranes that contain compositions comprising a propylene based elastomer and an impact propylene-ethylene copolymer. The propylene based elastomer was Vistamaxx™ 6102.

PCT Publication WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202.

PCT Publication WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Patent Ser. No. 62/121,230, filed on Feb. 26, 2015, is directed to a roofing membrane composition of a 10-50 wt % of a propylene-based elastomer, 5-40 wt % of a thermoplastic resin, at least one flame retardant, and at least one ultraviolet stabilizer.

U.S. Pat. No. 9,434,827 discloses a composition which is useful in roofing membranes that comprises on a polymer basis, from 40 to 75% by weight of at least one propylene based elastomer; and 25 to 60% by weight of at least one random polypropylene copolymer.

In traditional mixtures, an at least semicrystalline polyolefin material such as polyethylene or polypropylene, which provides the mechanical strength and resistance to temperature change, is mixed with a flexible blend component. This flexible blend component is miscible, or at least compatible, with the polyolefin. Flexible blend components used to date include, ethylene-propylene-diene rubber (EPDM), ethylene-n-alk-ene copolymers, and also polypropylene-based elastomers. At present, the most common TPO polymer used in roofing membranes is Hifax™ CA10A, which is a polypropylene random copolymer matrix with EP rubber well dispersed throughout the polypropylene phase. However, improvements and cost efficiency are still needed.

There still remains a need for roofing membranes that demonstrate flexibility at service temperatures, particularly elevated temperatures. There is also a need for more economical roofing membranes which can meet such elevated temperature requirements.

SUMMARY

A polymer blend composition comprising a propylene polymer having from 10-60% crystallinity, a linear low density polyethylene, a propylene copolymer; and an ethylene copolymer. In one embodiment, the polymer blend composition comprises 15-75 wt % of the propylene polymer, 30-50 wt % of the linear low density polyethylene, and 5 to 20 wt % of the propylene copolymer and ethylene copolymer combined.

In one embodiment, the linear low density polyethylene comprises a butene comonomer.

In one embodiment, the propylene polymer comprises rubber dispersed in the polypropylene.

The foregoing polymer blends comprising a linear low density polyethylene are useful in preparing a roofing membrane. The roofing membrane would be prepared from a membrane composition comprising a polymer blend of the present invention in an amount ranging from 40 to 75 wt % of the composition, and will generally include additives, e.g., at least one flame retardant, at least one ultraviolet stabilizer and at least one pigment.

Among other factors, it has been surprisingly discovered that combining linear low density polyethylene with a thermoplastic polyolefin (TPO), e.g., the propylene polymer, an economical TPO membrane with improved high temperature thermal stability can be obtained. This is particularly achieved using the present polymer blends, and this is achieved without modifying or changing the stabilizer package. Adding the linear low density polyethylene to the formulation has also been discovered to provide some processing advantages.

DETAILED DESCRIPTION

Liner low density polyethylene (LLDPE) is well known in the polymer industry and is readily available commercially. Linear low-density polyethylene is a substantially linear polymer (polyethylene), with significant numbers of short branches, commonly made by copolymerization of ethylene with longer-chain olefins. Linear low-density polyethylene differs structurally from conventional low-density polyethylene (LDPE) because of the absence of long chain branching. The linearity of LLDPE results from the different manufacturing processes of LLDPE and LDPE. In general, LLDPE is produced at lower temperatures and pressures by copolymerization of ethylene and such higher alpha-olefins as butene, hexene, or octene. The copolymerization process produces an LLDPE polymer that has a narrower molecular weight distribution than conventional LDPE and in combination with the linear structure, significantly different rheological properties.

The production of LLDPE is initiated by transition metal catalysts, particularly Ziegler or Philips type of catalyst. The actual polymerization process can be done either in solution phase or in gas phase reactors. Usually, octene is the comonomer in solution phase while butene and hexene are copolymerized with ethylene in a gas phase reactor. LLDPE has higher tensile strength and higher than impact and puncture resistance than does LDPE. It is very flexible and elongates under stress. It can be used to make thinner films, with better environmental stress cracking resistance. It has good resistance to chemicals. It has good electrical properties.

The present invention provides an economical polymer blend that is useful in roofing membranes that exhibits excellent high temperature thermal stability as well as reduced tackiness. These advantages are unprecedented and offer the industry a solution to its quest for a more economical yet better performing roofing membrane. These advantages have been discovered by combining linear low density polyethylene with the more traditional thermoplastic polyolefin polymers. The linear low density polyethylene substitutes for some of the polyolefin polymers used in conventional roofing membrane polymer blends in a manner which allows phase stability. Maintaining phase stability is important, otherwise the physical properties and stability of the finished article are adversely affected. To the contrary, the right balance of linear low density polyethylene has been found to insure phase stability, without changing or modifying the stabilizer package, while also providing a final product of improved performance. The improved performance is particularly evident in thermal stability, and maintaining that thermal stability over time.

In one embodiment, provided is a polymer blend composition comprising linear low density polyethylene, a TPO polymer, i.e., a propylene polymer (preferably having rubber dispersed therein), and a combination of a compatibilizers comprising a polypropylene (PP) matrix copolymer and a polyethylene (EP) matrix copolymer.

The most popular TPO resin used today for single ply roofing membranes is an in-reactor blend resin that has a minor amount of polypropylene copolymer as the matrix phase and ethylene/polypropylene rubber as the majority phase well dispersed in the polypropylene. The rubber phase is so fine and uniformly distributed that it cannot be made by any conventional mechanical mixing. Due to this unique morphology, it gives good mechanical properties yet maintains its flexibility that is preferred by the roofers for installation convenience.

This unique morphology, i.e., fine rubber distributed uniformly in the polypropylene matrix, can be maintained even when alternative polyolefin resins like those off-the-shelf are added to this in-reactor grade resin. The linear low density polyethylene (LLDPE), preferably with butene as its comonomer, can be used to partially replace the in-reactor resin. The LLDPE is generally softer than most polypropylene resins made by the Ziegler-Natta process. Also, LLDPE is tough. Compatibility is always an issue since LLDPE is polyethylene based and the TPO matrix is polypropylene based. It has been surprisingly discovered, however, that compatibility can be achieved by using a combination of compatibilizers, i.e., a polypropylene copolymer and a polyethylene copolymer. The resulting blend is compatible so the blend is stable under high temperature and long term aging. The preferred compatibilizers are metallocene made polypropylene and polyethylene copolymer elastomers. There are two types of random copolymers made by metallocene technology: polypropylene and polyethylene elastomers. The common grades in the market are Engage™ or Exact™ for the polyethylene copolymer and Versify™ and Vistamaxx™ for the polypropylene copolymer. One popular grade in-reactor resin used in the TPO roofing industry is Hifax CA10A made by Equistar.

In general, the polymer blend of the present invention comprises four components. Linear low density polyethylene (LLDPE) is one component, and is readily available. LLDPE is commercially available from chemical companies such as Exxon Mobil Corporation, The Dow Chemical Company, LyondellBasel Industries N.V., Saudi Basic Industries Corporation (SABIC), Borealis AG, Formosa Plastics Corporation, U.S.A. (Formosa Plastics), China Petroleum & Chemical Corporation (Sinopec Corporation), INEOS Group AG, Chevron Phillips Chemical Company LLC, NOVA Chemicals Corporation, Sasol Limited, and Braskem S.A.

While LLDPE is prepared by copolymerization of ethylene and alpha-olefins, for the purposes of the present invention it is most preferred that butene is the comonomer. It has been discovered that the best performance and processing characteristics are achieved when the LLDPE is prepared with butene as the comonomer.

Examples of suitable LLDPE resins, with butene comonomer, is Dow™ DFDA-7047 NT7, available from Dow Chemical Company of Midland, Mich. Chevron Philips 6109CL can also be used successfully. In general, the LLDPE has a density of 0.915 to 0.920 g/cm$^3$, and in another embodiment, from 0.916 to 0.918 g/cm$^3$.

The amount of LLDPE used in the polymer blend composition of the present invention ranges from 30-50 wt %. In another embodiment, the amount ranges from 35 to 45 wt %, based on the total weight of the polymer blend.

The second component is a propylene polymer having a crystallinity of from 10-60%. Such resin components are well known. The propylene polymer can be a random copolymer, an impact polymer, or homopolymer. The random propylene polymer generally exhibits a crystallinity of from 15-40%. The impact propylene polymer generally exhibits a crystallinity of from 15-40%. The propylene homopolymer can have a crystallinity of from 10-60%.

In one embodiment, the propylene polymer having a crystallinity of from 10-60% is a propylene polymer having rubber dispersed therein. The rubber can be any suitable buffer, but is generally EP rubber (ethylene/propylene rubber). EDM rubber (ethylene/propylene/diene monomer) can also be used.

Such polymers are well known. For example, Hifax™ CA10A, available from LyondellBasel Industries of Arlington, Va. The Hifax CA10A resin is a polypropylene matrix with EP rubber as the majority phase, the rubber well dispersed in the polypropylene. The rubber phase is finely and uniformly distributed throughout the polypropylene phase. The polypropylene phase is a random copolymer of polypropylene/polyethylene. Another commercial and useful propylene polymer having rubber dispersed therein is available from ExxonMobil Chemical Company under the tradename ExxonMobile™PP. One specific product is ExxonMobil™PP7032. Another suitable TPO for roofing membranes is Ineos TOOG-OO, available from Ineos Olefins and Polymers, U.S.A.

The amount of the propylene polymer component in the polymer blend generally ranges from 15 to 75 weight percent, based on the weight of the blend. In one embodiment, the amount ranges from 20 to 50 weight percent. The propylene polymer component generally has a crystallinity of from 10-60%, more likely 15 to 40%. The propylene polymer component generally has a density that ranges from 0.87 to 0.92 g/cm$^3$, with a density in the range of from 0.88 to 0.91 in one embodiment. The melt flow rate of the propylene polymer component is generally in the range of from 0.5 to 20 g/10 min, and in one embodiment the melt flow ranges from 0.5 to 5.0 g/10 min. A melt flow rate in the range of from 0.6 to 4.0 g/10 min is exhibited in one embodiment.

The third component is a propylene copolymer, generally a propylene/ethylene copolymer having a polypropylene matrix.

This third component is generally used as a compatibilizer in the blend, to aid in maintaining the blend and maintaining phase stability. The ethylene content of the copolymer can vary.

Suitable propylene copolymers that can be used as a compatibilizer are commercially available, and include Vistamaxx™ copolymers from ExxonMobil Chemical Company. For example, Vistamaxx™ 6102 or 6202 may be used. Infuse™ olefin copolymers available from Dow Chemical and Engage™ polyolefin elastomers from Dow Chemical can also be successfully used. The polypropylene copolymer generally has a density from 0.860 to 0.900 g/cm$^3$ and a melt flow rate of 1-25 g/10 min.

The fourth component is an ethylene copolymer, generally an ethylene/propylene copolymer having a polyethylene matrix. This fourth component is generally used as the second compatibilizer in the blend. It has been found that the use of these two copolymers, the third and fourth component, is important to maintaining phase stability. Without the combination of these two specific compatibilizers, good results with regard to phase stability are not achieved.

Suitable ethylene copolymers that can be used as a compatibilizer are commercially available, and include Engage™, available from Dow Chemical. Another copolymer is the ethylene alpha olefin copolymer Exact™, available from ExxonMobil Chemical. In general, the ethylene copolymer has a density in the range of from 0.860 to 0.915 g/cm$^3$, and a melt flow rate in the range of about 0.5 to 5.0 g/10 min.

In one embodiment, the third and/or fourth components have been prepared using a metallocene catalyst system. This is preferred. The combination of the two copolymers is generally present in the polymer blend composition in an amount ranging from 5 to 20 wt %, based on the total weight of the blend. In one embodiment, the amount ranges from 8 to 15 wt %. The relative ratio of the two copolymer compatibilizers depends on the desired viscosity or flow properties of the blend. In general, either component can be present in an amount ranging from 30 to 70 wt % based on the weight of the combination of copolymers. In one embodiment, the propylene copolymer comprises about one third of the combination and the ethylene copolymer about two thirds of the combination of components.

The blend of polymers can be prepared by physically blending the different components. The blend is therefore a combination of polymer components that have already been formed and recovered before mixing or otherwise combined. The blending can also occur somewhat in solutions, miscible carriers, or by melt blending. The resulting blend is a multiphase polymer composition.

The balance of components in the blend is important because polypropylene and polyethylene will not maintain phase stability if the mix is not balanced. Instead, regions of polypropylene and polyethylene will form, which will affect the physical properties and stability of the finished article adversely. However, by maintaining the components in the range of from 30 to 50 wt % LLDPE; 15 to 75 wt % of the polypropylene component and 5 to 20 wt % of the combination of propylene and ethylene copolymer compatibilizers, a polymer blend including HDPE is obtained which maintains phase stability and provides even improved heat stability. Cost efficiency is also realized by the present blend, while still achieving improved performance characteristics.

The polymer blend can also contain a random olefin polymer, such as a random polypropylene polymer. Such an addition can be in the 0 to 18 wt % range. The addition is generally made to adjust the flex modulus to a desired level.

Once the polymer blend has been achieved, and often pelletized, the blend can be used to prepare a membrane for use in a roof. Generally, a membrane composition is prepared where certain additives and fillers are added to the polymer blend. In one embodiment, at least one flame retardant, at least one ultraviolet stabilizer and at least one pigment is added to the polymer blend. This prepares a membrane composition of from 40-75 wt % of the polymer blend, based on the weight of the entire membrane composition, with the remaining components comprising at least one flame retardant, ultraviolet stabilizer and pigment. The flame retardant can be present, in one embodiment, in an amount ranging from 20 to 40 wt %, and the pigment in an amount of about 5 wt %. The pigment often used is $TiO_2$.

As noted above, the compositions described herein can also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 60 wt %, or up to about 55 wt %, or up to about 50 wt % of the roofing membrane composition. In some embodiments, the additives may comprise at least 25 wt %, or at least 30 wt %, or at least 35 wt %, or at least 40 wt % of the roofing membrane composition.

In some embodiments, the roofing membrane composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or magnesium hydroxide. For example, the calcium carbonate or magnesium hydroxide may be pre-blended into a masterbatch with a thermoplastic resin, such as polypropylene, or a polypropylene/polyethylene copolymer. For example, the flame retardant may be pre-blended with a polypropylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

In some embodiments, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with a thermoplastic resin, such as polypropylene. For example, the UV stabilizer may be pre-blended with a polypropylene or an impact polypropylene-ethylene copolymer, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures across a wide range, along with stability at elevated temperatures such as those from 40° C. to 100° C. The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

The following Examples are provided to further illustrate certain embodiments of the present invention, but the Examples are not intended to be limiting.

Examples

Several formulations were prepared for testing and comparison. No. 1 cap and No. 1 core only comprise one compatibilizer copolymer, i.e., Dow Engage 8180—a polyethylene based copolymer compatibilizer. No. 2 cap and No. 2 core exhibit the present invention where a combination of compatibilizer copolymers are present, i.e., Dow Engage 8180 and Vistamaxx 6202 (a polypropylene copolymer compatibilizer). A control TPO was also run.

The formulations are provided in the Table below. The formulations were tested for tensile, tear and flexibility, as well as aging characteristics. The results are in the Table below.

In the Table formulations, magnesium hydroxide (MAH) is the flame retardant, white concentrate is polyolefin blended with highly loaded titanium dioxide. Black concentrate is a carbon black based composition.

Aging Cycle survived is determined by a rheological method that can quantify the chain degradation. The UV/Heat degradation test was conducted as follows:

For the cap ply: the molded sample was clamped in a Xenon Arc radiation chamber for 2 days. After that, the sample was taken out of the frame and put it in the 275° F. oven for 5 days. These two combined processes in a week is called 1 cycle.

For the core ply: a sample was put in the 275° F. oven for a week to complete a one week cycle.

TABLE

| TPO Formulations | No. 1 cap | No. 1 core | No. 2 cap | No. 2 core |
| --- | --- | --- | --- | --- |
| Equistar CA10A | 26 | | 23.5 | |
| Ineos T00G-00 | | 33 | | 31.5 |
| Dow DFDA-7047 | 35 | 33 | 35 | 32.7 |
| Vistamaxx 6202 | | | 6 | 2.7 |
| Dow Engage 8180 | 5.5 | 8 | 5.5 | 4.7 |
| Total rPP 7238 | 7 | | | |
| Magnesium hydroxide | 20.4 | 20.4 | 20.4 | 20.3 |
| White concentrate | 4.5 | 3.2 | 4.5 | 3.5 |
| Black Concentrate | | 1.8 | | 1 |
| Stabilizer package | 1.6 | 0.6 | | |
| UV concentrate | | | 5.1 | |
| AO concentrate | | | | 3.6 |
| Modulus from DMA, Pa | 13.5E9 | 12.7E9 | 9.5E9 | 12.5E9 |
| Tensile Strength, psi | 2032 | 1665 | 3810 | 1786 |
| Tensile elongation, % | 745 | 685 | 909 | 648 |
| Die-C Tear, (lb/in) | 406 | 407 | 448 | 406 |
| Cycles survived after UV/Heat Degradation | 6 wks | 5 wks | 6 wks | 6 wks |

The No. 2 cap and core formulations exhibited improved tensile, tear and flexibility in general, as well as equal or improved aging characteristics. The same improvements were also exhibited compared to a typical TPO formulation having no LLDPE.

Overall, the present polymer blend decreases the cost of roofing membranes. An economical alternative is thereby provided. The processing advantages also allow improved manipulation and more efficient processing. The quite surprising improved properties in heat stability, tensile, tear and flexibility most importantly lead to a better final product. Because of the performance characteristics, the roof will exhibit a longer life and better weatherability. The heat stability also allows for improved welding of the roofing membranes. Better welding also translates into a better roof, both in function and life. The seams will last longer and not pop-up because of the better seam welds. The present polymer blend provides a more economical and better roof membrane, which in turn provides a better roof.

While the foregoing is directed to embodiments of the present invention, other and further embodiments of the invention may be devised without departing from the basic scope thereof, and the scope thereof is determined by the claims that follow.

What is claimed is:

1. A membrane composition comprising:
   a) from about 40 wt % to 75 wt % of a polymer blend composition comprising;
      (i) 15-75 wt % of a propylene polymer having from 10-60% crystallinity and rubber dispersed therein;
      (ii) 30-50 wt % of a linear low density polyethylene; and
      (iii) 5-20 wt % of a combination of a propylene copolymer and an ethylene copolymer;
   b) at least one flame retardant;
   c) at least one ultraviolet stabilizer; and
   d) at least one pigment.

2. The membrane composition of claim 1, wherein the flame retardant comprises 20-40 wt % of the composition.

3. The membrane composition of claim 1, wherein the pigment comprises from 4 to 6 wt % of the composition.

4. The membrane composition of claim 1, wherein the pigment comprises $TiO_2$.

5. A roofing membrane comprising the membrane composition of claim 1.

6. A roof comprising the roofing membrane of claim 5.

7. A method of preparing a thermoplastic polyolefin film, the method comprising forming a thermoplastic polyolefin film from the composition of claim 1.

8. The membrane composition of claim 1, comprising calcium carbonate.

9. The membrane composition of claim 1, wherein the flame retardant comprises calcium carbonate.

10. The membrane composition of claim 8, wherein the calcium carbonate comprises at least 25 wt % of the membrane composition.

11. The membrane composition of claim 1, wherein the amount of flame retardant, ultraviolet stabilizer and pigment comprises at least 25 wt % of the membrane composition.

12. The membrane composition of claim 1, wherein the amount of propylene copolymer in the combination (iii) of a propylene copolymer and an ethylene copolymer comprises from 30 to 70 wt % based on the weight of the combination of copolymers.

* * * * *